D. A. CALLAWAY.
PRORATING WEIR.
APPLICATION FILED JUNE 23, 1908.
947,325.
Patented Jan. 25, 1910.
2 SHEETS—SHEET 1.
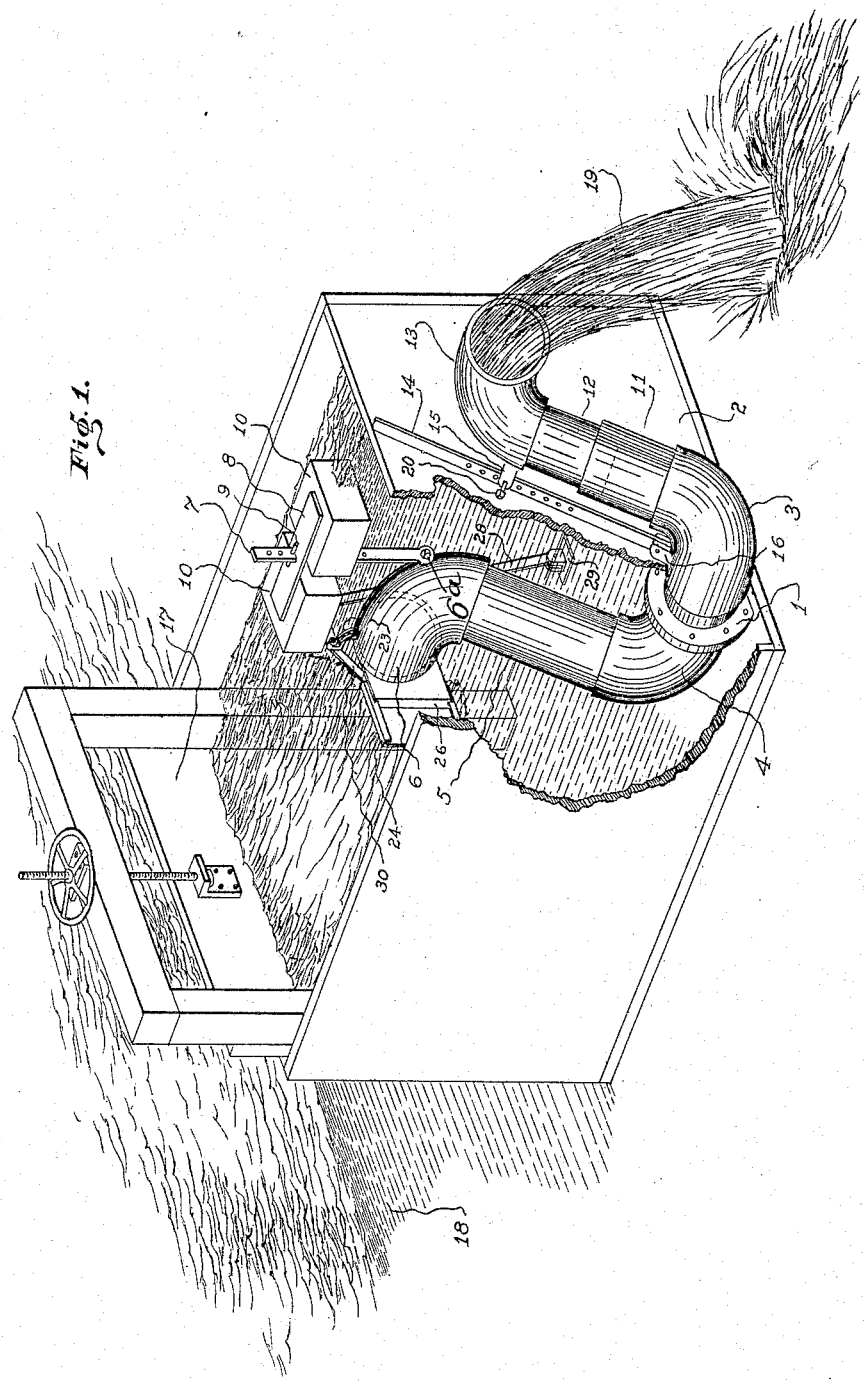
Witnesses.
Inventor:
David Abram Callaway
By Lyman J. Henry
Attorney.

D. A. CALLAWAY.
PRORATING WEIR.
APPLICATION FILED JUNE 23, 1908.
947,325.
Patented Jan. 25, 1910.
2 SHEETS—SHEET 2.
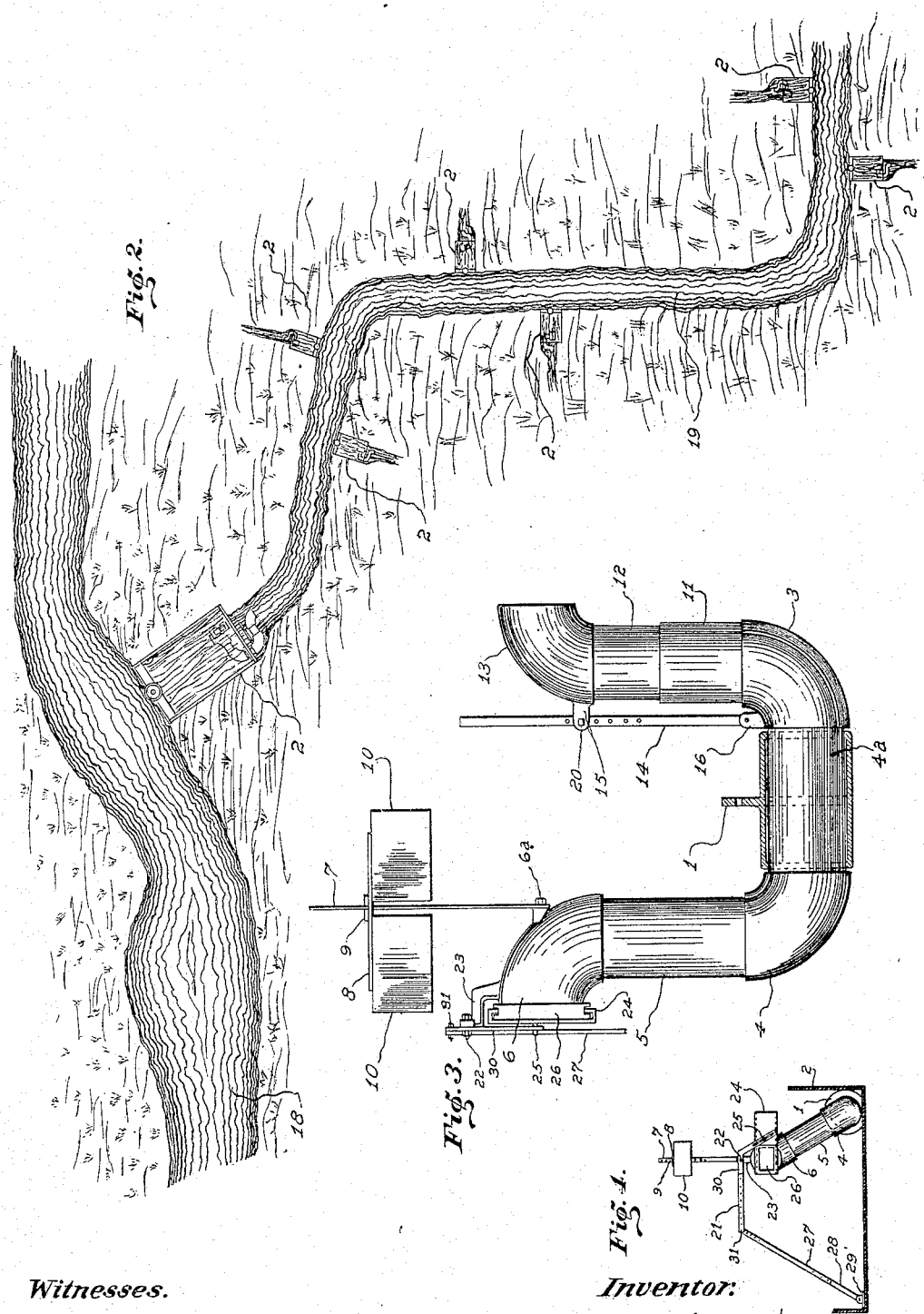
Witnesses.
C. M. Walker
R. R. Miller
Inventor:
David Abram Callaway
By Lyman J. Henry
Attorney.

UNITED STATES PATENT OFFICE.

DAVID ABRAM CALLAWAY, OF PUEBLO, COLORADO.

PRORATING-WEIR.

947,325.  Specification of Letters Patent.  Patented Jan. 25, 1910.

Application filed June 23, 1908.  Serial No. 439,961.

*To all whom it may concern:*

Be it known that I, DAVID ABRAM CALLAWAY, a citizen of the United States, residing at No. 6 Terrace View, city of Pueblo, county of Pueblo, and State of Colorado, have invented a new and useful Prorating-Weir, of which the following is a specification.

My invention relates to improvements in prorating weirs in which the water is conducted under any required pressure within the practical limits by means of the use of floats, adjustable pipes and self acting cut offs; and the objects of my improvement are first, to provide a means of regulating the pressure of water discharged through the weir; second, to provide means for the flow of water being automatically regulated by the varying height of water; third, to provide means for automatically regulating the amount of water to pass through the weir; and fourth, to provide means capable of being adjusted to different conditions from the same source of water supply automatically regulating the amount of water. I attain these objects by the mechanisms illustrated in the accompanying drawings in which, Figure 1 is a perspective view of my device with the corner of head gate box broken away to show interior arrangement; Fig. 2 is a plan view of my device in position at main source of supply of water and at distributing laterals; Fig. 3 is a detail side elevation of my device; and, Fig. 4 is a front elevation of my device.

The intake elbow 6 has attached to it a rectangular casting 26. On the outside of said elbow 6 and opposite the center of opening in rectangular casting 26 is placed trunnion 6ª to which is pivotally attached bar 7, to which is adjustably attached floats 10—10 united by cross piece 8 adjustable on said bar 7 by pin 9, said floats being of sufficient size to sustain the whole device as hereinafter shown. Pipe 5 is attached to elbow 6 to which is attached elbow 4 connected by pipe 4ª with elbow 3. Between elbows 4 and 3 on pipe 4ª and turnable thereon is hub 1 at the center of which is a flange with perforations for bolts to attach to head gate box. On the inner angle of elbow 3 is element 16 to which is attached bar 14. Pipe 11 is attached to elbow 3. Pipe 12 is of smaller diameter than pipe 11 but closely fitting the interior of 11 and slidable therein. Discharge elbow 13 is attached to pipe 12. On discharge elbow 13 is element 15 having pin 20; bar 14 is attached to 16 and has therein perforations by means of which pipe 12 may be raised or lowered and fixed the required height by pin at 20. Floats 10 are preferably made air tight on sides and top and open at the bottom and thereby give the full effect of buoyancy of the contained air.

Head gate box 2 is placed at the source of water supply and head gate 17, when device is in position, is slightly raised so as to permit a required flow of water underneath into the head gate box. The prorating weir is then attached and placed in the head gate box, as shown in Fig. 1, by bolt means through the flange of hub 1, and the floats 10 are adjusted by bar 7 so as to permit the intake elbow 6 to be a required distance below the surface of the water in the head gate box and said floats sustain said elbow 6 at the adjusted distance from the surface of the water through varying heights of water and thereupon by means of bar 14 the elevation of discharge elbow 13 is regulated at the required height to discharge a given amount of water. It will thus be seen that if a given amount of water is required through a varying flood that my device may be adjusted to give the said amount and the device is also placed so that when adjusted for use the same leans to one side from the perpendicular through hub 1, and when the elbow 6 and opening 26 reach the bottom of box 2 the water begins to diminish according to the head of water in box 2.

I have also provided as part of my device and usable therewith a cut-off which is specially shown in Fig. 4. At the side of the box 2 and on the bottom is attached a casting 29 slotted and perforated to receive pivotally an arm which is composed of two parts 27 and 28, each part being perforated and both bolted together thereby providing for adjustment of length of arm and the same is perforated at the upper end of 27 where it is united at 31 with the arm composed of two parts, 21 and 30, which are perforated and bolted together so as to give adjustment of any required length. 30 is pivoted at 22 on an upward extending element 23 fixed on elbow 6. The remaining part of the arm is bent downwardly and slidably attached in a slot by pin 25 on door 24. The turned under edges of door 24 are slidable in grooves on outer edges of casting 26. The various arms having been adjusted it follows that as the depth of water decreases from a given point termed normal, casting 26 and elbow 6 decline and thereby by means of said arms, door 24 is shoved across the intake casting 26 and the supply of water proportionately shut off and the reverse of operation occurs upon the increase of the supply of water.

My prorating weirs may be placed, one in the head gate of the canal 19 and then several may be placed one in each head gate of each lateral, as shown in Fig. 2, and may be adjusted so as to prorate the water supply to each lateral upon the condition required; to one within certain limits of the supply in the canal and to others their prorated portion throughout the supply of water in the canal, and this is accomplished by the adjustment of the float, the height of the discharge elbow, as well as the adjustment of the cut off device, all as shown.

I claim:

1. In a prorating weir device of the character described, having a headgate box; the combination of a pipe with a horizontal intake and horizontal discharge attached to upright parts, elbows and horizontal pipe connecting upright parts, said pipe sustained by float means, and the said float means attached to said pipe at a point horizontally central to the opening in said intake, a hub carrying, turnable therein, the said horizontal connecting part of said pipe, all substantially as described.

2. In a prorating weir device of the character described the combination of a pipe with a horizontal intake and horizontal discharge attached to upright parts, elbows and horizontal pipe connecting upright parts; a hub carrying, turnable therein, the said horizontal connecting part of said pipe; said pipe sustained by float means; floats closed at top and sides and open at bottom joined together and attached by adjustable rod means to said horizontal intake; and the said float means pivotally attached to said pipe at a point horizontally central to the opening in said intake; the upright pipe connecting with said horizontal discharge being composed of slidable parts having rod and pin means of adjustment; all substantially as described.

3. In a prorating weir device of the character described the combination of a pipe with horizontal intake and horizontal discharge attached to upright parts, elbows and horizontal pipe connecting upright parts; a hub carrying, turnable therein, the said horizontal connecting part of said pipe; said pipe sustained by float means; floats closed at top and sides and open at bottom joined together and attached by adjustable rod means to said horizontal intake; the said float means being attached to said pipe at a point horizontally central to the opening in said intake; the upright pipe connecting with said horizontal discharge being composed of slidable parts having rod and pin means of adjustment; a rectangular piece attached to outer part of said intake carrying a slidable door thereon; an adjustable arm pivotally attached at one end to element in head gate box and pivotally attached at other end to adjustable bent arm; and an adjustable bent arm pivotally attached to said adjustable arm and pivotally attached on element on said horizontal intake, the downwardly bent part of said bent arm having slot in which is connected pin on said slidable door; all substantially as described.

DAVID ABRAM CALLAWAY.

Witnesses:
GEO. L. WALKER,
C. M. WALKER.